United States Patent [19]

Klosterhaus et al.

[11] Patent Number: 4,887,683
[45] Date of Patent: Dec. 19, 1989

[54] RACK AND PINION STEERING GEAR WITH INTERMEDIATE TAKE-OFF

[75] Inventors: Edwin G. Klosterhaus, Livonia; Robert E. Feindel, Sterling Heights, both of Mich.

[73] Assignee: TRW Inc., Lyndhurst, Ohio

[21] Appl. No.: 268,505

[22] Filed: Nov. 8, 1988

[51] Int. Cl.$^4$ .............................................. B62D 5/04
[52] U.S. Cl. ...................................... 180/148; 280/96; 74/498
[58] Field of Search ...................... 180/148, 154, 155; 280/96, 95.1; 74/388 PS, 422, 498

[56] References Cited

U.S. PATENT DOCUMENTS

| | | |
|---|---|---|
| 3,605,933 | 9/1971 | Millard . |
| 3,801,125 | 4/1974 | Golzenberger et al. .............. 74/498 |
| 3,834,727 | 9/1974 | Adams . |
| 4,028,957 | 6/1977 | Wright .................................. 74/498 |
| 4,479,400 | 10/1984 | Rieger . |
| 4,683,971 | 8/1987 | Westercamp et al. . |
| 4,819,499 | 4/1989 | Morell .................................. 74/498 |

OTHER PUBLICATIONS

Birch, "Automotive Suspension and Steering Systems", pp. 329-330 and 469-470.

Primary Examiner—Charles A. Marmor
Assistant Examiner—Donn McGiehan
Attorney, Agent, or Firm—Tarolli, Sundheim & Covell

[57] ABSTRACT

An apparatus for steering a vehicle having a longitudinal central axis. The apparatus comprises a pinion gear and a rack member in meshing engagement with the pinion gear. The rack member is movable in a path extending transverse to the longitudinal central axis of the vehicle. A bridge member is attached to the rack member and is movable upon movement of the rack member. The bridge member has a portion co-extensive with the rack member. A first attaching portion on the bridge member attaches a first tie rod at a location adjacent the rack member and intermediate the axial ends of the rack member. During steering of the vehicle, the first attaching portion moves in a path located entirely on one side of the longitudinal central axis of the vehicle. A second attaching portion on the bridge member attaches a second tie rod at a location adjacent the rack member and intermediate the ends of the rack member. During steering of the vehicle, the second attaching portion moves in a path located entirely on another side of the longitudinal central axis of the vehicle opposite the side containing the path of movement of the first attaching portion.

20 Claims, 4 Drawing Sheets

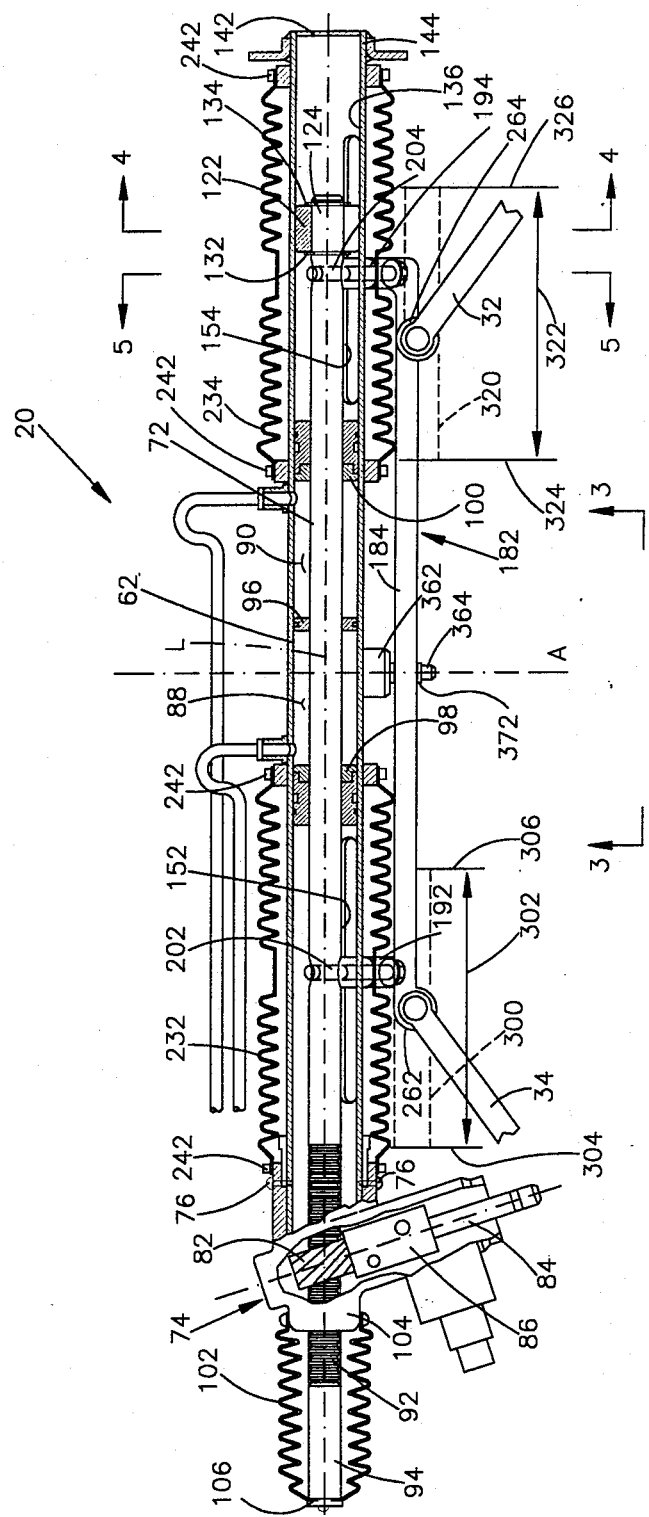

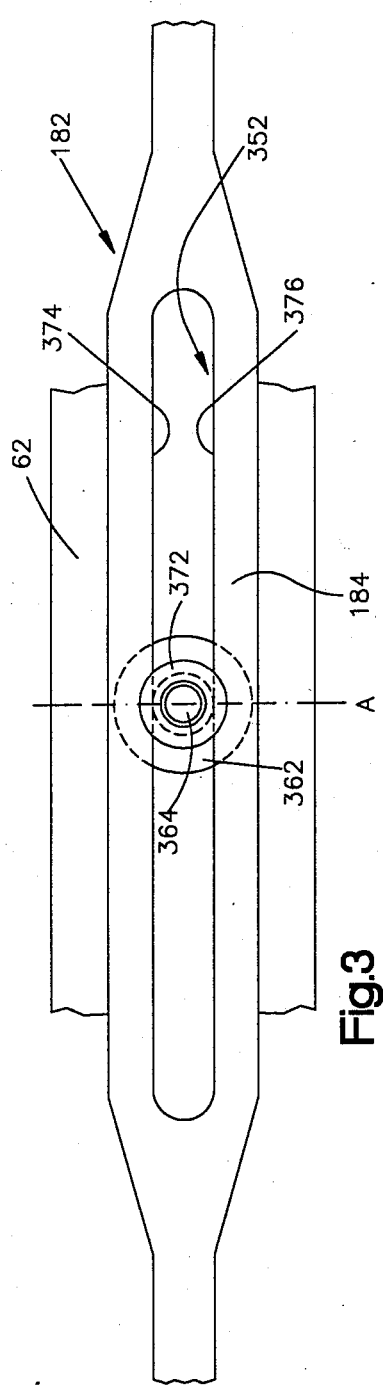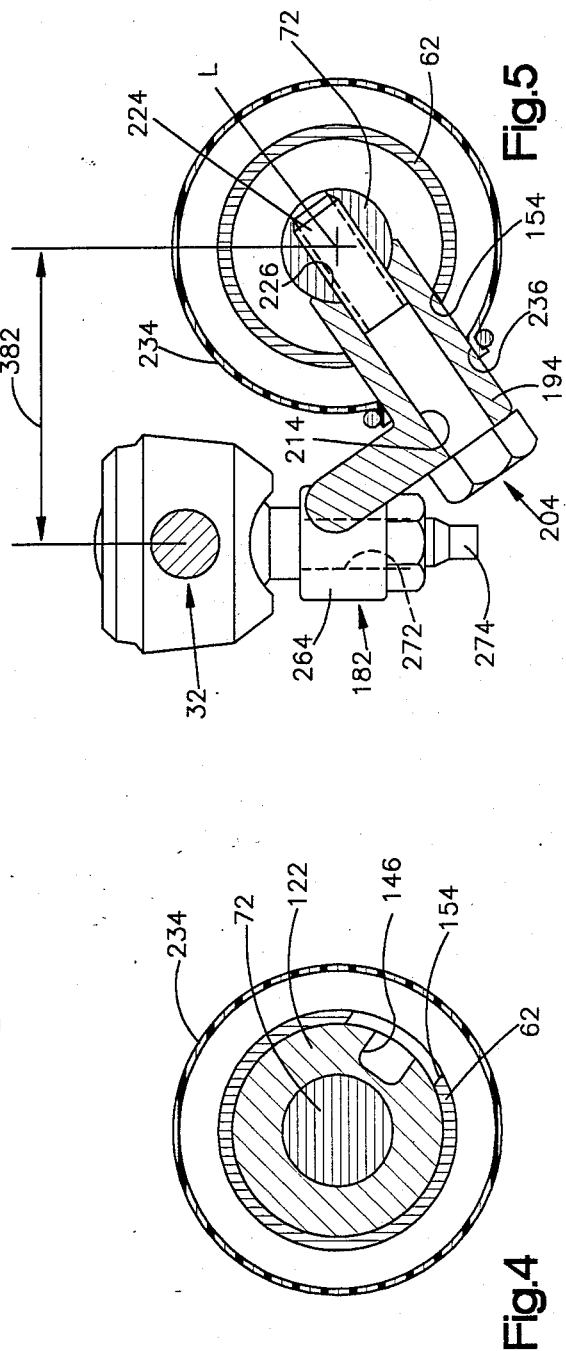

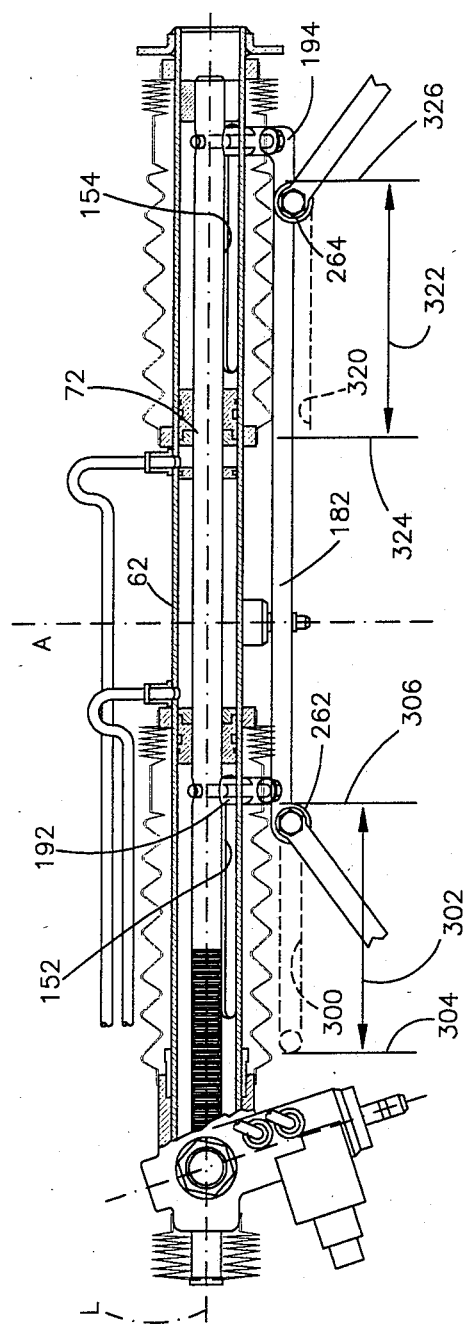
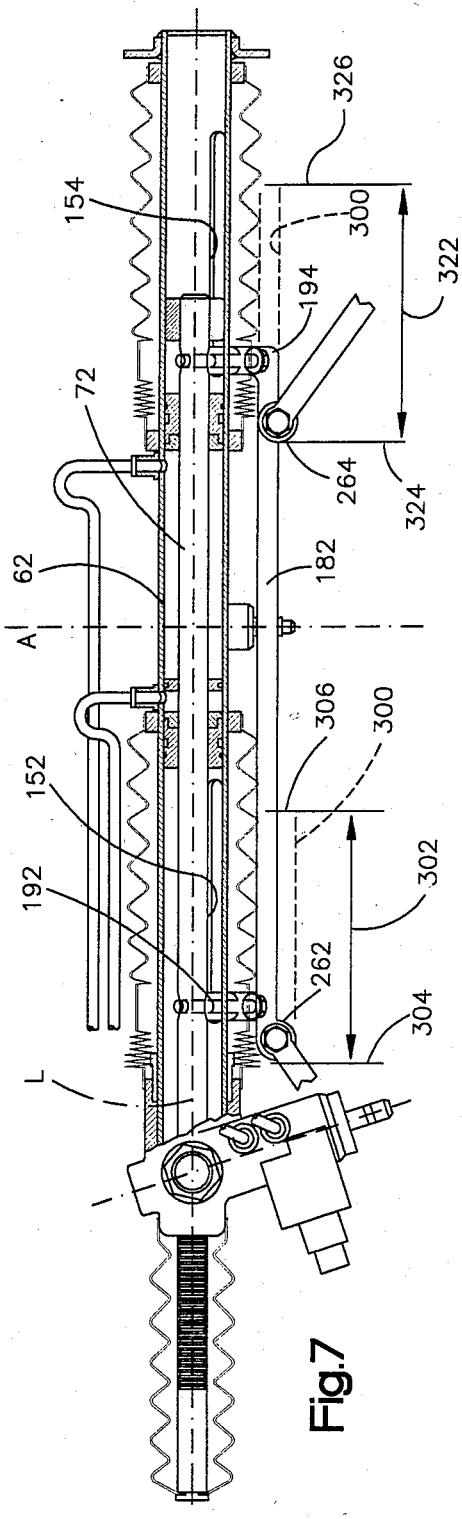

RACK AND PINION STEERING GEAR WITH INTERMEDIATE TAKE-OFF

BACKGROUND OF THE INVENTION

1. Field of the Invention

The present invention relates to a rack and pinion steering gear for steering the steerable wheels of a vehicle.

2. Description of the Prior Art

Rack and pinion steering gears for vehicles are known. U.S. Pat. No. 3,834,727 discloses an end take-off rack and pinion steering gear. The steering gear includes a rack housing supporting a rack member for axial movement. A pinion gear, connected with a steering wheel of the vehicle, meshingly engages with rack teeth formed in the rack member. The rack member moves relative to the rack housing in response to rotation of the pinion gear. A respective one of a pair of tie rods is connected to each axial end portion of the rack member. The tie rods move to steer the steerable wheels of the vehicle in response to movement of the rack member.

U.S. Pat. No. 4,479,400 discloses a center take-off hydraulic power assist rack and pinion steering gear. The steering gear includes a rack housing supporting a rack member for axial movement. A piston is connected to an axial end portion of the rack member. The piston slides within the rack housing and defines a pair of power assist chambers. A longitudinally extending opening is centrally located in the rack housing. A slide member is connected to the rack member and extends through the opening in the rack housing. Tie rods are attached to the slide member, and thus move to steer the vehicle upon movement of the rack member.

These known rack and pinion steering gears are relatively light in weight and relatively easy to install on the vehicle. However, the locations at which the tie rods are attached to the rack member are limited by the design of the steering gears. The locations may not permit steering of certain vehicles according to a principle known as "Ackerman steering". Ackerman steering is defined as all of the wheels of a vehicle turning through concentric arcs during steering. Thus, Ackerman steering minimizes wear on tires of the vehicle. Further, since in the prior art the locations at which the tie rods are attached to the rack member are limited, "bump steer" may not be minimized.

SUMMARY OF THE INVENTION

The present invention is directed to an improved rack and pinion steering gear. The steering gear comprises a pinion gear and a rack member having rack teeth in meshing engagement with the pinion gear. The rack member is movable in a path extending transverse to the longitudinal central axis of the vehicle. A bridge member is attached to the rack member and has a portion co-extensive with the rack member and within the axial extent of the rack member. The bridge member is movable with the rack member. First means is located on the bridge member for attachment of a first tie rod at a location intermediate the ends of the rack member. The first means moves in a path during steering of the vehicle. The path of movement of the first means is located entirely on one side of the longitudinal central axis of the vehicle. Second means is also located on the bridge member for attachment of a second tie rod at a location intermediate the ends of the rack member. The second means moves in a path during steering of the vehicle. The path of movement of the second means is located entirely on another side of the longitudinal central axis of the vehicle opposite the side on which the first means is located.

The steering gear further includes a rack housing for supporting the rack member for axial movement. A pair of spaced apart longitudinally extending openings are located in the rack housing. Each of a pair of axially spaced mounting portions of the bridge member extend through a respective one of the openings in the rack housing for connecting the bridge member with the rack member. A bearing is attached to an axial end portion of the rack member and is slidable within the rack housing for supporting the rack member for axial movement relative to the rack housing.

During vehicle travel, the bridge member is subjected to forces which tend to rotate the bridge member and rack member about the longitudinal central axis of the rack member. The present invention contemplates means which prevents these forces from rotating the bridge member and rack member. One embodiment of such means comprises a longitudinally extending opening located in the bridge member. A projection extends from the rack housing and supports a rotatable member which is receivable in the opening in the bridge member. The rotatable member engages a surface of the opening in the bridge member to block rotation of the bridge member and rack member about the longitudinal central axis of the rack member.

The present invention enables the location of the inner tie rods to be selected (i) to achieve ideal Ackerman steering or (ii) to minimize bump steer or (iii) to provide a compromise between minimized bump steer and ideal Ackerman steering. This selection is effected by positioning the first means and second means for attachment of the first and second tie rods to the bridge member at desired locations along the bridge member.

BRIEF DESCRIPTION OF THE DRAWINGS

Further features of the present invention will become apparent to those skilled in the art to which the present invention relates from reading the following specification with reference to the accompanying drawings, in which:

FIG. 2 is a longitudinal cross sectional view of the rack and pinion steering gear of FIG. 1;

FIG. 3 is a view of the rack and pinion steering gear of FIG. 2, taken approximately along line 3—3 in FIG. 2;

FIG. 4 is a cross sectional view of the steering gear of FIG. 2, taken approximately along line 4—4 in FIG. 2;

FIG. 5 is a cross sectional view of the steering gear of FIG. 2, taken approximately along line 5—5 in FIG. 2; and FIGS. 6 and 7 are views similar to FIG. 2 with parts in different positions.

DESCRIPTION OF A PREFERRED EMBODIMENT

Figure 1:
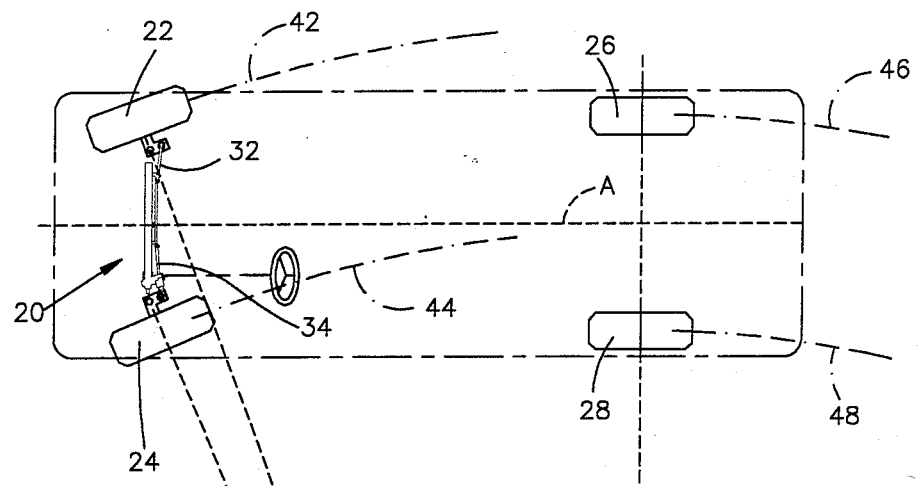
FIG. 1 is a schematic view of a vehicle including a rack and pinion steering gear embodying the present invention and illustrating Ackerman steering.

A vehicle having a hydraulic power assist rack and pinion steering gear 20 embodying the present invention is illustrated in FIG. 1. The vehicle has a longitudinal central axis A. The steerable wheels 22, 24 of the vehicle are connected with the steering gear 20 by a respective one of a pair of tie rods 32, 34 and are turned from the straight-ahead position parallel to the longitudinal central axis A of the vehicle. All of the wheels 22, 24, 26, 28 of the vehicle preferably turn through concentric arcs 42, 44, 46, 48, respectively, according to the Ackerman steering principle. During steering of the vehicle, particularly through a turn having a relatively short turning radius, it is desirable that the wheels 22, 24, 26, 28 of the vehicle turn through the concentric arcs 42, 44, 46, 48 to reduce wear on the tires of the vehicle.

The rack and pinion steering gear 20, embodying the present invention, includes a rack housing 62 (FIG. 2) which is connectable with the frame or body of the vehicle. A rack member 72 is located in the rack housing 62 and is axially movable relative to the rack housing in a direction substantially perpendicular to the longitudinal central axis A of the vehicle. A pinion tower 74 is attached to the rack housing by fasteners 76. The pinion tower 74 supports a pinion gear 82, input shaft 84 and a control valve 86. The pinion gear 82 meshingly engages with rack teeth formed in a first axial end portion 94 of the rack member 72. Upon relative rotation between the input shaft 84 and the pinion gear 82, the control valve 86 directs pressurized fluid to one of a pair of power assist chambers 88, 90.

Each of the hydraulic power assist chambers 88, 90 is variable in volume and is defined by a piston 96 fixed to and movable with the rack member 72. A respective fluid seal 98, 100 is supported in a bearing fixed to the rack housing. The area of the oppositely facing working surfaces of the piston 96 are equal. While a hydraulic power assist rack and pinion steering gear 20 is illustrated in the preferred embodiment, it will be apparent that the present invention may be embodied in an electric power assist rack and pinion steering gear or in a manual rack and pinion steering gear.

A bearing (not shown) located in the pinion tower 74 supports the first axial end portion 94 of the rack member 72 for movement relative to the rack housing 62. A bellows 102 is clamped around a portion 104 of the pinion tower 74 and is secured to an axial end surface 106 of the rack member 72 by a screw. The bellows 102 seals dirt and other contaminants from entering the end of the steering gear 20.

Another bearing 122 is fixed to a second axial end portion 124 of the rack member 72 opposite the first axial end portion 94. A pair of snap rings 132, 134 are located on either side of the bearing 122 to prevent axial movement of the bearing relative to the rack member 72. The bearing 122 moves with the rack member 72 and slides along a bore 136 in the rack housing 62 to support the rack member for movement relative to the rack housing. The bearing 72 permits the rack member 72 to be relatively short as compared to having the second axial end portion 124 of the rack member 72 supported in a bearing fixed to the rack housing 62. Thus, a shorter overall length of the steering gear 20 results, and the steering gear is thus also lighter in weight. A cap 142 is fixed in the end of the rack housing 62 forming an airtight end portion 144 of the rack housing. The bearing 122 (FIG. 4) at the second axial end portion 124 of the rack member 72 has a groove 146 extending axially for the length of the bearing. Thus, air is free to pass through the groove 146 and does not become trapped in the end portion 144 of the rack housing 62 to dampen movement of the rack member 72.

A pair of axially spaced apart and longitudinally extending openings 152, 154 are located in the rack housing 62. Each of the openings 152, 154 is located entirely on a respective side of the longitudinal central axis A of the vehicle when the steering gear 20 is installed on the vehicle. The longitudinal extent of each of the openings 152, 154 in the rack housing 62 is larger than the length of axial movement of the rack member 72. Each of the openings 152, 154 is located axially outwardly of the seals 98, 100 of the working chambers 88, 90. The bearing 122 (FIG. 4) at the second axial end portion 124 of the rack member 72 has a groove 162 located adjacent the opening 154 so air does not become trapped in the end portion 166 of the rack housing 62 and act to dampen movement of the rack member 72.

A bridge member 182 (FIG. 2) is connected to the rack member 72. The bridge member 182 extends generally parallel to the rack member 72 and has a central portion 184 extending co-extensive to the rack member 72. The longitudinal extent of the bridge member 182 is located completely within the longitudinal extent of the rack member 72. A pair of mounting portions 192, 194 are located at axially opposite end portions of the bridge member 182. Each mounting portion 192, 194 extends through a respective opening 152, 154 in the rack housing 62 and engages the rack member 72. The mounting portions 192, 194 engage the rack member 72 at axially spaced locations and on opposite sides of the longitudinal central axis A of the vehicle.

Each one of a pair of screws 202, 204 extends through a bore 214 (FIG. 5) in a respective one of the mounting portions 192, 194 of the bridge member. A threaded end portion 224 of each screw threadingly engages a respective threaded opening 226 in the rack member 72. Each screw 202, 204 is tightened to draw the respective mounting portion 192, 194 of the bridge member 182 against the rack member 72 and to maintain the bridge member connected to the rack member. During movement of the rack member 72 relative to the rack housing 62, the bridge member 182 moves axially with the rack member in a direction substantially perpendicular to the longitudinal central axis A of the vehicle to cause steering of the vehicle.

Each one of a pair of bellows 232, 234 is clamped around a portion of the rack housing 62 and has an opening 236 (FIG. 6) which tightly fits around the mounting portion 194 of the bridge member 184. The clamps 242 of each bellows 232, 234 are located on axially opposite sides of the respective opening 152, 154 in the rack housing 62 to seal the interior of the steering gear 20 from dirt and other contaminants. Each bellows 232, 234 is axially expandable and contractable during movement of the rack member 72 and bridge member 182 relative to the rack housing 62.

A pair of attaching portions 262, 264 (FIG. 2) are located at axially spaced positions along the bridge member 182. Each of the attaching portions 262, 264 are located adjacent a respective mounting portion 192, 194 and offset from the mounting portion to allow access to the screws 202, 204. The attaching portions 262, 264 are connectable with one of the tie rods 34, 32, respectively. Each attaching portion 262, 264 comprises an opening 272 formed in the bridge member 182. A stud portion 274 of the tie rod 32 is received in the opening 272 of the attaching portion 264 to connect steerable wheel 22 (FIG. 1) with the bridge member 182. A stud portion of the tie rod 34 is similarly received in the attaching portion 262.

The attaching portion of the bridge member 182 is located axially outside of the mounting portion 192. The attaching portion 264 of the bridge member 182 is located axially inside of the mounting portion 194. It will be apparent that both attaching portions 262, 264 could be located axially outside of their respective mounting portion 192, 194 or could be located axially inside of their respective mounting portion or a combination of the two. The locations of the attaching portions 262, 264 on the bridge member 182 may vary from vehicle to vehicle. The attaching portions 262, 264 are located along the bridge member 182 at appropriate positions to (i) provide or substantially provide ideal Ackerman steering of the vehicle, (ii) to minimize bump steer, or (iii) provide a compromise between ideal Ackerman steering and minimized bump steer. It will be apparent that a single design of a steering gear 20 can be used for many vehicle applications and only requires that the bridge member 182 be designed for a particular vehicle application.

The attaching portion 262 on the bridge member 182 moves in a path 300 during steering of the vehicle having a length 302 extending between end limits 304, 306. When the rack member 72 is moved to its right axial steering limit, as viewed in FIG. 6, the attaching portion 262 moves to the end limit 306. When the rack member 72 is moved to its left axial steering limit, as viewed in FIG. 7, the attaching portion 262 moves to the end limit 304. The path 300 of movement of the attaching portion 262 is entirely located on the left side, as viewed in FIGS. 2, 6 and 7, of the longitudinal central axis A of the vehicle.

The attaching portion 264 also moves in a path 320 during steering of the vehicle having a length 322 extending between end limits 324, 326. When the rack member 72 is moved to its right axial steering limit, as viewed in FIG. 6, the attaching portion 264 moves to the end limit 326. When the rack member 72 is moved to its left axial steering limit, as viewed in FIG. 7, the attaching portion 264 moves to the end limit 324. The path 320 of movement of the attaching portion 264 is entirely located on the right side, as viewed in FIGS. 2, 6 and 7, of the longitudinal central axis A of the vehicle.

A longitudinally extending opening 352 (FIG. 3) is located in the central portion 184 of the bridge member 182. The opening 352 is slightly larger in length than the lengths 302, 322 of the paths 300, 320 of movement of the attaching portions 262, 264 of the bridge member. A support 362 is fixed to and extends from the rack housing 62 at a location intermediate the opening 152, 154 in the rack housing. A shaft 364 is fixed to the support 362 and extends through the opening 352 in the bridge member 182.

A rotatable bearing member 372 is supported for rotation on the shaft 364 and is engageable with one of a pair of surfaces 374, 376 defining the opening 352 to prevent the bridge member 182 and rack member 72 from rotating about the longitudinal central axis L of the rack member 72 due to forces transmitted through the tie rods 32, 34 to the attaching portions of the bridge member 182. The shaft 364 and rotatable bearing member 372 prevent forces from acting through a moment arm 382 (FIG. 5) extending between the longitudinal central axis L of the rack member 72 and the attaching portions 262, 264. These forces would tend to rotate the bridge member 182 and rack member 72 about the longitudinal central axis L of the rack member and result when the steerable wheels of the vehicle encounter variations in the road surface, such as curbs, potholes or other debris.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, we claim:

1. An apparatus for steering a vehicle having a longitudinal central axis, said apparatus comprising:
   a pinion gear;
   a rack member for meshing engagement with said pinion gear and being movable in a path extending transverse to the longitudinal central axis of the vehicle;
   a bridge member attached to said rack member and movable upon movement of said rack member, said bridge member having a portion co-extensive with said rack member;
   first means on said bridge member for attachment of a first tie rod intermediate the axial ends of said rack member, during steering of the vehicle said first means moving in a path located entirely on one side of the longitudinal central axis of the vehicle; and
   second means on said bridge member for attachment of a second tie rod intermediate the axial ends of said rack member, during steering of the vehicle said second means moving in a path located entirely on another side of the longitudinal central axis of the vehicle opposite the location of the path of movement of said first means.

2. The apparatus set forth in claim 1 further including a rack housing for supporting said rack member for axial movement, and means for blocking rotation of said bridge member.

3. The apparatus set forth in claim 2 wherein said blocking means comprises surface means defining a longitudinally extending opening in said bridge member, a projection extending from said rack housing, means on said said projection being receivable in the opening in said bridge member for engaging a surface of the opening to block rotation of said bridge member about the longitudinal central axis of said rack member.

4. The apparatus set forth in claim 2 further including surface means defining a pair of spaced apart longitudinally extending openings in rack housing and having bridge member mounting means extending through each of the openings for connecting axially opposite end portions of said bridge member with axially spaced portions of said rack member.

5. The apparatus set forth in claim 2 further including a bearing attached to an axial end portion of said rack member and movable with said rack member and for supporting said rack member for movement relative to said rack housing.

6. A rack and pinion steering gear comprising:
   a rack housing;
   a rack member supported in said rack housing and being movable relative to said rack housing;
   said rack housing having a pair of spaced openings therein; and
   a bridge member having a first portion extending parallel to said rack member, a second portion connected to said rack member through one of said spaced openings in said rack housing, and a third portion connected to said rack member through the other of said spaced openings in said rack housing;

said bridge member having first means for attachment of a first tie rod thereto and having second means spaced from said first means for attachment of a second tie rod thereto.

7. The rack and pinion steering gear set forth in claim 6 further including means for blocking rotation of said bridge member about a longitudinal central axis of said rack member.

8. The rack and pinion steering gear set forth in claim 7 wherein said blocking means comprises surface means defining a longitudinally extending opening in said bridge member, a projection extending from said rack housing, and means on said projection being receivable in the opening in said bridge member for engaging a surface of the opening to block rotation of said bridge member about the longitudinal central axis of said rack member.

9. The rack and pinion steering gear set forth in claim 6 further including a bearing attached to an axial end portion of said rack member and movable with said rack member and for supporting said rack member for movement relative to said rack housing.

10. The rack and pinion steering gear set forth in claim 6 wherein said second and third portions of said bridge member are located at axially opposite end portions of said bridge member and extend through said pair of spaced openings in said rack housing, and further including third means for connecting said second and third portions of said bridge member to said rack member.

11. The rack and pinion steering gear set forth in claim 10 wherein said first means is located adjacent said second portion of said bridge member and said second means is located adjacent said third portion of said bridge member, and said first and second means each comprise an attaching opening for receiving a portion of a tie rod end.

12. An apparatus for steering a vehicle having a longitudinal central axis, said apparatus comprising:
a housing connectable with the vehicle;
a rack member having rack teeth formed in a first axial end portion of said rack member and being movable in a direction transverse to the longitudinal central axis of the vehicle and relative to said housing for steering the vehicle;
a piston located intermediate the axial ends of said rack member and having oppositely facing working surfaces with equal area;
a pinion gear for meshing engagement with said rack teeth on said rack member; and
a bearing attached to a second axial end portion of said rack member and supporting said rack member for movement relative to said housing;
first means for connecting a first tie rod with said rack member at a location intermediate the axial end portions of said rack member, during steering of the vehicle said first means moving in a path located entirely on one side of the longitudinal central axis of the vehicle; and
second means for connecting a second tie rod wit said rack member at a location intermediate the axial ends of said rack member, during steering of the vehicle said second means moving in a path located entirely on another side of the longitudinal central axis of the vehicle opposite the location of the path of movement of said first means.

13. The apparatus set forth in claim 12 wherein said housing has a closed end portion, and further including means defining a passage through said bearing to enable said bearing to move within the closed end portion of said housing without damping movement of said rack member.

14. An apparatus for steering a vehicle having a longitudinal central axis, said apparatus comprising:
a pinion gear;
a rack member for meshing engagement with said pinion gear and being movable in a path extending transverse to the longitudinal central axis of the vehicle;
first means for attachment of a first tie rod with said rack at a location intermediate the axial ends of said rack member, during steering of the vehicle said first means moving in a path located entirely on one side of the longitudinal central axis of the vehicle; and
second means for attachment of a second tie rod with said rack member at a location intermediate the axial ends of said rack member, during steering of the vehicle said second means moving in a path located entirely on another side of the longitudinal central axis of the vehicle opposite the location of the path of movement of said first means.

15. The apparatus set forth in claim 14 further including a bridge member connectable with said rack member and movable upon movement of said rack member, said bridge member having a portion co-extensive with said rack member, and wherein said first means defines an opening located in said bridge member for attachment of the first tie rod, and said second means defines a second opening located in said bridge member and spaced from the first opening for attachment of the second tie rod.

16. The apparatus set forth in claim 15 further including a rack housing for supporting said rack member for axial movement, and means for blocking rotation of said bridge member.

17. The apparatus set forth in claim 16 wherein said blocking means comprises surface means defining a longitudinally extending opening in said bridge member and a projection extending from said rack housing, said projection being receivable in the opening in said bridge member for engaging a surface of the opening to block rotation of said bridge member about the longitudinal central axis of said rack member.

18. The apparatus set forth in claim 16 further including surface means defining a pair of spaced apart longitudinally extending openings in rack housing, and said bridge member having mounting means extending through each of the openings for connecting axially opposite end portions of said bridge member with axially spaced portions of said rack member.

19. The apparatus set forth in claim 18 wherein said bridge member mounting means comprises a pair of spaced apart portions extending through said pair of spaced openings, and further including means for connecting said bridge member mounting means to said rack.

20. The apparatus set forth in claim 16 further including a bearing attached to an axial end portion of said rack member and movable with said rack member and for supporting said rack member for movement relative to said rack housing.

* * * * *

UNITED STATES PATENT AND TRADEMARK OFFICE
CERTIFICATE OF CORRECTION

PATENT NO. : 4,887,683

DATED : December 19, 1989

INVENTOR(S) : Edwin G. Klosterhaus, Robert E. Feindel

It is certified that error appears in the above-identified patent and that said Letters Patent is hereby corrected as shown below:

Column 6, Line 43, Claim 3, change "on said said projection" to -- on said projection --

Column 7, Line 64, Claim 12, change "wit" to -- with --

Signed and Sealed this

Twenty-sixth Day of February, 1991

*Attest:*

HARRY F. MANBECK, JR.

*Attesting Officer*     *Commissioner of Patents and Trademarks*